UNITED STATES PATENT OFFICE.

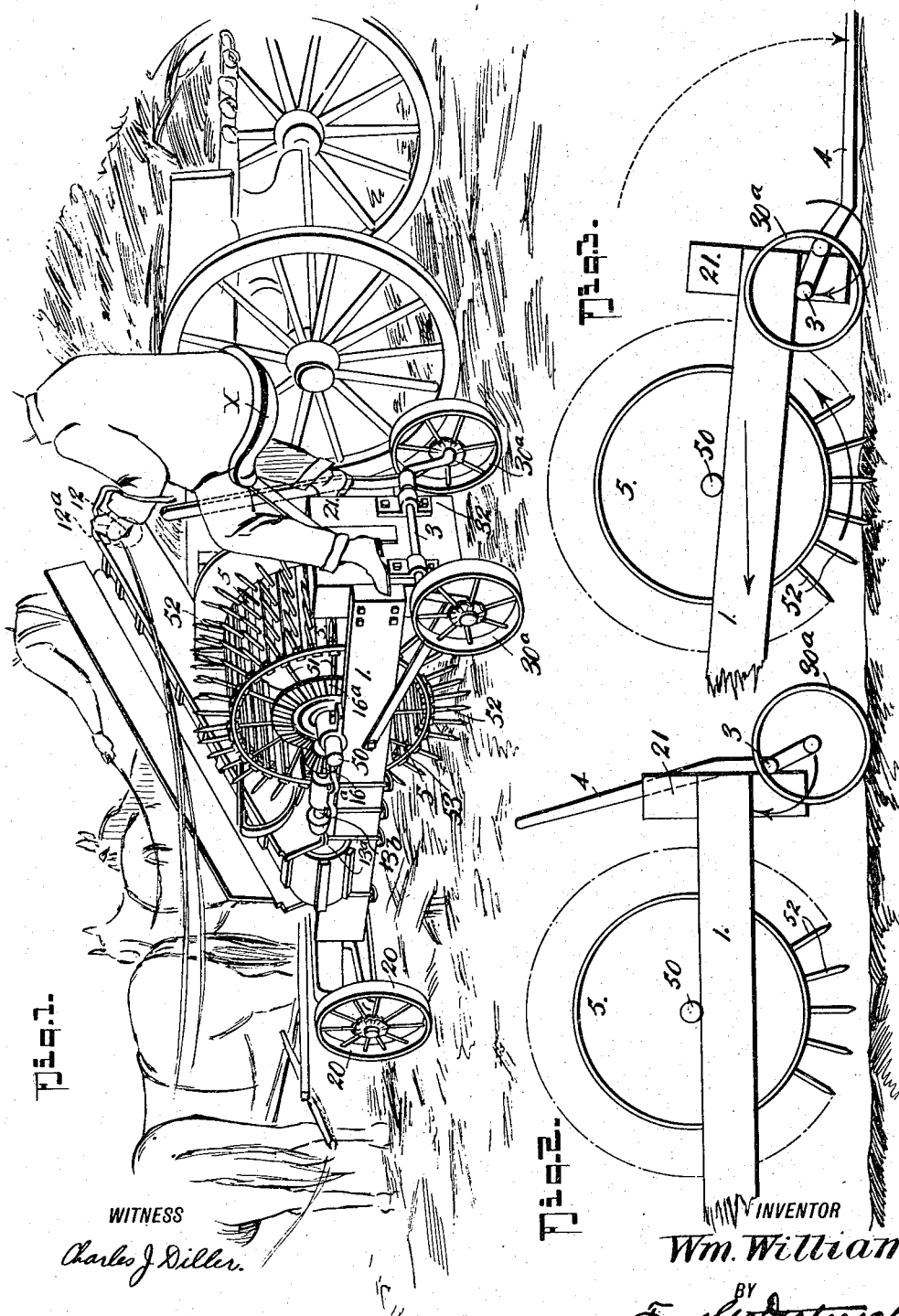

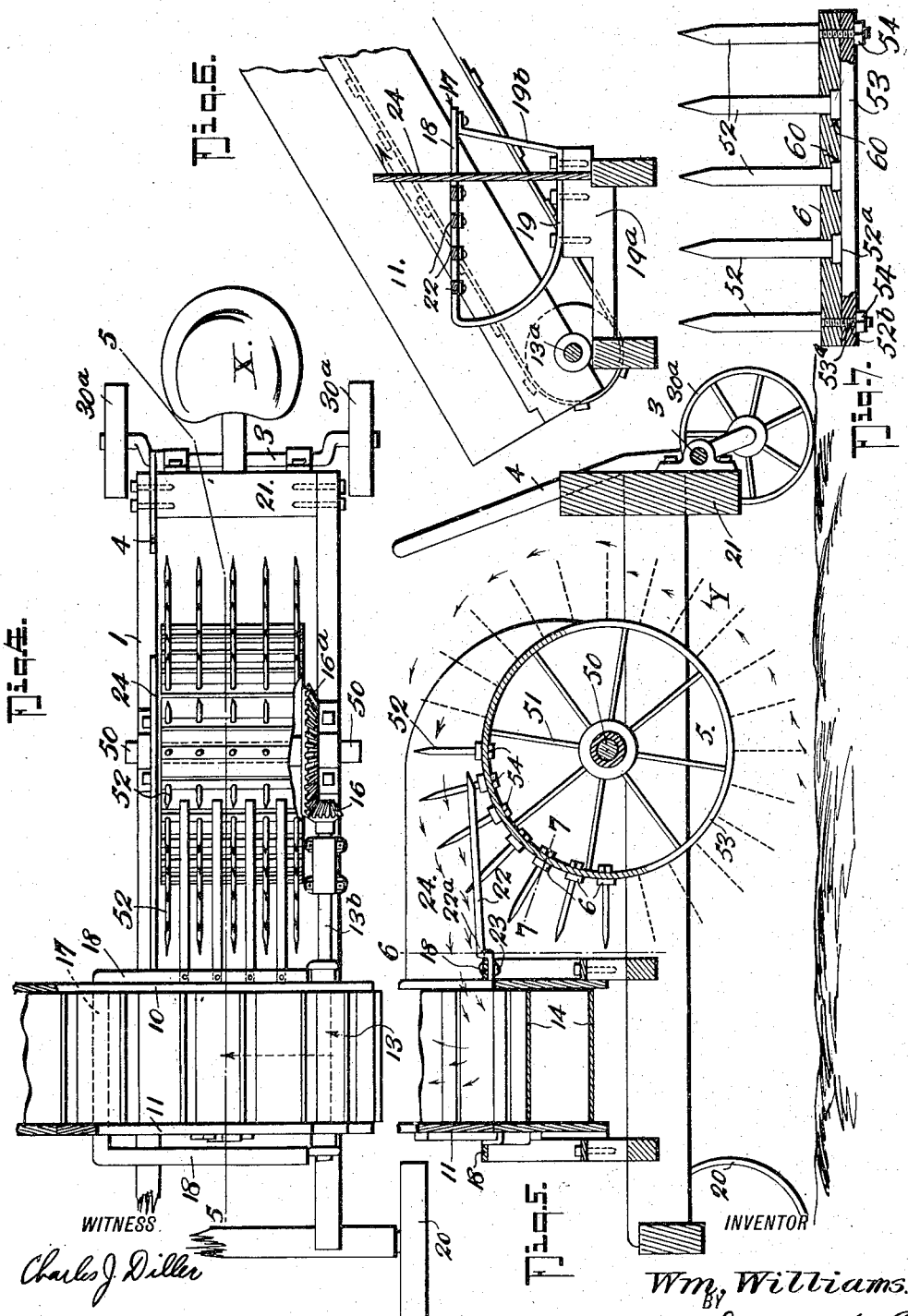

WILLIAM WILLIAMS, OF SMITH, NEVADA.

MANURE-LOADER.

1,216,902.  Specification of Letters Patent.  Patented Feb. 20, 1917.

Application filed August 30, 1915. Serial No. 48,034.

*To all whom it may concern:*

Be it known that I, WILLIAM WILLIAMS, residing at Smith, in the county of Lyon and State of Nevada, have invented a new and Improved Manure-Loader, of which the following is a specification.

My invention has reference to that class of loading machines that are more especially designed for being used in connection with farm wagons for loading manure, hay, or straw from the ground onto the wagon, and it primarily has for its object to provide a loading means of the general character stated of a simple, inexpensive, and compact nature, that may be readily used in connection with ordinary farm wagons, and which operates to quickly and effectively serve its intended purposes.

My invention embodies generally, a loading means mounted on a wheeled frame adapted for being drawn along at one side of the wagon being loaded, in which is included an adjustable rotary rake, or lifting drum, that picks up the manure conveys it upwardly and forwardly, an endless conveyer onto which the lifted manure is discharged and which elevates it laterally of the machine and discharges it onto the wagon, and which is set into operation when the rotary rake is adjusted to its operative position.

In its more specific nature my invention consists in the peculiar combination and novel arrangement of the parts, hereinafter described, specifically pointed out in the appended claims, and illustrated in the accompanying drawings, in which:

Figure 1 is a perspective view of my invention, the same being shown as applied for use, the rotary rake or ground wheel being shown at the lifted or inoperative position.

Fig. 2 is a diagrammatic side elevation of the rotary rake or ground wheel, a portion of the frame on which it is mounted and the rear truck with the crank axle, the latter being adjusted to lift the rear end of the frame for holding the rotary rake to the elevated or inoperative position.

Fig. 3 is a view similar to Fig. 2, the crank axle of the rear truck being adjusted for lowering the rear end of the frame with the rotary rake or ground wheel at the operative or "pick up" position.

Fig. 4 is a plan view of my improved loader.

Fig. 5 is a longitudinal section thereof on the line 5—5 on Fig. 4.

Fig. 6 is a transverse section thereof on the line 6—6 on Fig. 5, and illustrating the coöperative arrangement of grid or rake devices for clearing the lifting members of the rotary rake, and Fig. 7 is a detail section of a portion of the rotary rake or ground wheel rim with a set of rake or pick up members attached.

In carrying out my invention I provide a rectangular frame that includes longitudinal side beams or sills 1—1, a front cross member that constitutes a front axle for the front truck wheels 20, and a rear cross beam 21 that projects above and below the sills 1—1, the reason for which will hereinafter appear.

3 designates a rock shaft, that journals in bearings 32 on the back of the rear cross beam 21, and the said shaft has its ends terminating in crank portions 30, 30, that form the axles for the rear truck wheels 30$^a$, and to the said shaft 3 is fixedly attached a long lever 4, as is clearly shown on Figs. 1, 2, and 3 of the drawings, by reference to which it will be seen that when the lever 4 is swung up, as in Figs. 1 and 2, the rear end of the frame is at its high or elevated position and when the said lever is down to the position shown in Fig. 3 the said rear end of the frame is at the dropped or lower position.

5 designates a rotary rake, which in my construction of wagon loader also acts as a ground or tractor wheel, since when at its operative position it is lowered to cause its rake teeth or fingers to enter the ground to such an extent that as the machine is drawn forward, the rotary rake, or wheel, is positively rotated in the desired direction for lifting and conveying the manure from the ground and conveying it upwardly and then forwardly to discharge it on the conveyer mechanism that delivers and loads it onto the wagon located adjacent to and drawn alongside of the loader in the manner clearly shown in Fig. 1 of the drawing.

The rotary rake or wheel 5 comprises a shaft 50 journaled on the upper edge of the opposite side sills 1—1, spokes 51, a rim 53 and rake teeth or fingers 52 which in the practical arrangement of my invention are in the nature of one inch square steel members and are eight inches long.

To provide for rigidly holding the rake teeth or fingers 52 the lower end of each tooth fits a non-circular aperture in a cross plate 6 that has a series of counter sunk recesses 60 for receiving the heads 52ª of all of the teeth in the set that engages the plate, excepting the end ones of such set, the said end teeth having extended and threaded shanks 52ᵇ for passing through the apertures 53ª in the rim 53, and for receiving the clamp nuts 54, as shown in detail in Fig. 7.

By mounting the rake teeth on the rim in transverse sets, in the manner shown and described, it is obvious that should one tooth in a set of the transverse rake teeth break, the entire set can be readily removed from the rim and a new tooth substituted for the broken one.

In my present construction of wagon loader, I arrange the conveyer mechanism in the manner best shown in Figs. 4, 5, and 6 by reference to which it will be noticed the conveyer devices extend transversely of the machine with the upper or discharging end projected laterally from the main frame, and the said conveyer includes an inner and an outer side wall 10—11, between which passes the endless conveyer or carrier belt 14 that takes over upper and lower rollers 12ª and 13ª on shafts 12 and 13 journaled in the upper and lower ends of the side walls or members 10—11.

The lower shaft 13 is coupled to a supplemental shaft 13ᵇ journaled on top of the outer sill 1, see Fig. 4, and it carries, at its outer end, a bevel pinion 16 that meshes with a bevel gear 16ª on the shaft 50 of the rotary rake as shown, it being understood that when the rotary rake is at its down or operative position as indicated by Fig. 3, motion is imparted to the conveyer for elevating the gathered material after it has been lifted by the wheel 5 and moved forwardly toward the conveyer and when the said wheel or rake is lifted out of the ground, as in Figs. 1 and 2 the conveyer becomes inoperative.

By referring to Figs. 4 and 6 it will be seen that the opposite side walls of the conveyer are held in the desired inclined position by a strap metal yoke 17, which extends under the conveyer and has horizontal side members 18 that terminate in downwardly curved portions that merge with foot members 19 for bolting onto the wooden blocks or sills 19ª that rest on the main frame and for bracing the yoke, the said strap irons are also bent up to form vertical supports 19ᵇ that rise up from the sills 19ª and are riveted or bolted to the yoke portion 17 proper.

At the side adjacent the rotary rake the side member 18 acts as a bearing for a series of cleaner teeth 22 that form a grid between which the teeth 52 of the rotary rake pass as they travel on their downward course.

The teeth 22 are held fixedly projected from the bearing 18 by having their ends shouldered as at 22ª and secured by rivets 23 to the member 18, see Fig. 5, it being understood that by securing the grid teeth in the manner stated, they are kept in proper alinement, relatively to the rake teeth, should the rivets 23 become loosened.

24 designates a side guard that extends up from the inner sill, see Fig. 6, projects above the teeth of the rotary rake and extends up to the inner side wall of the conveyer, and at this point it should be stated that the top edge of the said inner side wall of the conveyer or frame is considerably lower than the top edge of the outer side wall, the reason for which will presently appear.

From the foregoing description taken in connection with the accompanying drawings, the complete construction, the manner of operation and the advantages of my invention will be readily apparent.

In operation when the machine is to be transported across the field the operator, seated in the driver's seat X, mounted in the rear end of the main frame, see Fig. 1, swings the lever 4 up and holds it in the position shown in Fig. 1, thus lifting the rotary rake or wheel above the ground and out of the operative position and since it is thus held no motion is imparted to the conveyer.

When, however, it is desired to load the wagon, the lever 4 when released drops down onto the ground as shown in Fig. 3 and the weight of the wheel together with that of the operator, causes the teeth of the rotary rake to penetrate the ground sufficiently to cause a positive rotation of the rotary rake or wheel in the direction of the arrow Y and in consequence lift the load in the direction indicated in Fig. 2, and at the same time impart motion to the endless conveyer.

The material as it is lifted, is held from being thrown off the teeth, as the rear cross beam 21 forms a guard and causes the bunches lifted to firmly adhere to the lifter teeth.

The bunches of the material as they pass up are held from spreading out or off the inner end 1 of the sets of teeth by reason of the vertical side guard, which holds the load at that end of the teeth, which load as the rake teeth pass through the teeth of the grid is combed off the said rake teeth and pushed over the top edge of the inner side wall of the conveyer frame into the endless conveyer, it being understood that since the outer wall of the conveyer frame extends much higher than the inner wall, the said outer wall forms an abutment or guard to prevent the material being thrown over that side of the conveyer.

What I claim is:

1. A wagon loading means comprising the following elements in combination; a front axle having truck wheels, a framing including side beams fulcrumed at their front ends to the axle, whereby the rear end may be relatively raised, truck wheels for the rear end of said frame and means connecting said wheels with said frame for raising and lowering the said frame, a combined rotary rake and ground wheel journaled on the said side beams and located between such beams, a transversely extended elevator mechanism mounted at its lower end on the frame and in advance of the rotary rake, means for deflecting the material picked up by the rotary rake on to the lower end of the said elevator and power transmission that joins with the rake and the elevator for imparting motion to the said elevator.

2. In a wagon loader, a wheeled frame, a combined rotary rake and ground wheel journaled on the said frame, means for raising and lowering the rear end of the frame for lifting the rotary rake out of the ground and for bringing it into a traction engagement with the ground, a conveyer transversely mounted on the frame in advance of the rotary rake, and a fixedly held grid for coöperating with the teeth of the rotary rake to clear the said rake teeth and deflect the material onto the conveyer, and power transmission connections that join the conveyer and the rotary rake.

3. In a wagon loader, the combination of a wheeled frame, means for raising and lowering the rear end of the frame, a combined rotary rake and ground wheel journaled on the said frame, and adapted when the frame is lowered to move into a traction engagement with the ground, a rear cross member that forms a guard for holding the loads lifted by the rotary rake from sliding off the rake teeth as the said loads are lifted, a conveyer located transversely of the machine and in advance of the rotary rake, power transmission connections that join the conveyer and the rotary rake, directly with means in coöperative connection with the conveyer and the rotary rake for combing the teeth of the rotary rake, as the material is being moved toward the conveyer.

4. In a wagon loader of the character described; a frame including side beams, front and rear truck wheels, an elevator that extends across the front end of the frame, a combined rotary rake and ground wheel journaled between the said side beams and to the rear of the elevator that conveys the material rearwardly, upwardly and then forwardly on to the elevator, and power transmission mechanism driven by the ground wheel and in direct connection with the elevator for driving said elevator.

5. In a wagon loader of the character described; a frame including side beams, front and rear truck wheels, an elevator that extends across the front end of the frame, a combined rotary rake and ground wheel journaled between the said side beams and to the rear of the elevator that conveys the material rearwardly, upwardly and then forwardly on to the elevator, and power transmission mechanism driven by the ground wheel and in direct connection with the elevator for driving said elevator, means adapted to be manipulated by an operator riding on the machine for connecting said rear truck wheels with said side beams and for elevating the rear end of the frame to lift the said ground wheel from off the ground.

6. In a wagon loader, the combination of a wheeled frame, means for raising and lowering the rear end of the frame, a combined rotary rake and ground wheel journaled on the said frame, and adapted when the frame is lowered to move into a traction engagement with the ground, the said frame including a rear cross beam that forms a guard for holding the loads lifted by the rotary rake from sliding off the rake teeth as the said loads are lifted, a conveyer located transversely of the machine and in advance of the rotary rake, power transmission connections that join the conveyer and the rotary rake, and means in coöperative connection with the conveyer and the rotary rake for combing the teeth of the rotary rake, as the material is being moved toward the conveyer, and means for holding the material from being carried beyond the said conveyer.

WILLIAM WILLIAMS.

Copies of this patent may be obtained for five cents each, by addressing the "Commissioner of Patents, Washington, D. C."